Patented Nov. 14, 1933

1,934,823

UNITED STATES PATENT OFFICE 1,934,823

PRODUCTION OF COMPOUNDS OF CALCIUM CYANIDE

Curt Schumann, Reinhold Fick, and Erwin Oberreit, Ludwigshafen - on - the-Rhine, Germany, assignors to I. G. Farbenindustrie Aktiengesellschaft, Frankfort-on-the-Main, Germany, a corporation of Germany No Drawing. Application May 14, 1928, Serial No. 277,787, and in Germany May 20, 1927

8 Claims. (Cl. 23—79)

We have found that a double compound of calcium cyanide and ammonia can be advantageously produced by allowing hydrocyanic acid together with ammonia to act upon calcium compounds such as its oxid, hydroxid or water-soluble salts, in the presence of water. The double compound is comparatively stable in the presence of water, and can therefore be obtained, without difficulty in the anhydrous condition and kept for a considerable time without decomposing. Its aqueous solutions are stable, especially in the presence of an excess of ammonia, whereas, as is well known, solutions of calcium cyanide decompose rapidly and turn brown.

The preparation of the said double compound may be effected in various ways.

For example hydrocyanic acid may be passed, in association with gaseous ammonia, through a vigorously stirred suspension of lime, the latter being converted into cubical crystals of the ammonia calcium cyanide compound. The suspension medium may consist of water, or very advantageously of a concentrated solution of calcium cyanide containing ammonia. Again, a concentrated solution of calcium cyanide may be saturated with ammonia, whereupon the ammonia calcium cyanide compound crystallizes out, or a solution of calcium cyanide may be concentrated in a current of ammonia. By this manner of working macroscopic crystals of a diameter of about 0.2 millimeter and more, hitherto not obtainable, are produced. The resulting double compound of calcium cyanide and ammonia naturally still contains a little water, which cannot be completely eliminated even by centrifuging and pressing, and leads, during the subsequent drying of the compound, to its partial decomposition into hydrocyanic acid ammonia and calcium hydroxid. A considerable decomposition of this kind even occurs during careful warming in vacuo or in a current of inert gas.

This inconvenience can be prevented by freeing the said double compound from adherent water at a low temperature, a suitable method being to treat it with a current of dry ammonia, or to wash it with hygroscopic organic liquids such as alcohols of high percentage strength. According to this manner of working, the water present in the product is completely or to a large extent removed without any decomposition taking place. The resulting double salt, which is damp through the presence of alcohol, can then be freed from the adherent alcohol, without any special precautions, by heating it in a drying cupboard or other suitable drying apparatus, preferably in a partial vacuum. The products so obtained have practically the same cyanogen content in relation to the calcium content as the initial materials, and will keep indefinitely when moisture is excluded.

The complex compound obtained by this process usually corresponds to the composition of a calcium-cyanide-diammoniate, but it should be noted that products of a different composition are sometimes obtained. All these products are hereinafter referred to as calcium-cyanide-diammoniate.

The decomposition of the double compound into calcium cyanide and ammonia may be effected by heat if desired under diminished pressure or by any other suitable means.

The decomposition of the double compound of calcium cyanide and ammonia is not attended with any special difficulty when performed on a laboratory scale, in a thin stratum and under a good vacuum. In operating on a larger scale, however, difficulties sometimes arise, in that the expulsion of the ammonia proceeds at only a very slow rate, and is incomplete despite the employment of an elevated temperature, the prolonged heating being then liable to cause decomposition of the resulting cyanides.

These difficulties, occurring during the decomposition, are obviated by employing the double compound of calcium cyanide and ammonia in the form of coarse crystals as obtained for instance according to the example 1 hereinafter given. In such a case, the splitting of the ammonia compound proceeds rapidly and at a moderate temperature, and furnishes a very high-grade calcium cyanide, such as cannot be obtained, even with considerably longer and higher heating, from the double compound when in a state of fine powder.

The employment of the coarsely crystallizing form of the double compounds of calcium cyanide has the additional advantage that the expelled ammonia carries off with it only a small amount of calcium cyanide in the form of dust, whereas when material in the form of fine powder is used a very troublesome formation of dust occurs.

The grain size of the double compounds of calcium cyanide and ammonia used preferably exceeds about 0.2 millimeter in diameter.

The white high-grade calcium cyanide obtained by decomposing calcium cyanide diammoniate in the form of coarse crystals, is in the form of grains which have the appearance of the crystals of the diammoniate, but are somewhat opaque, and exhibit the valuable property of being not so readily decomposed by moisture as calcium cyanide in the form of fine powder hitherto only obtainable.

The following examples will further illustrate the nature of the said invention which however is not limited thereto.

*Example 1*

Hydrocyanic acid gas mixed with ammonia is passed at about 20° centigrade into a rigorously stirred suspension of calcium hydroxid or oxid in a saturated aqueous solution of calcium cyanide containing ammonia.

The lime disappears and its place is taken by the deposition of macroscopic crystals in the form of cubes and having a diameter exceeding 0.2 millimeter of the ammonia calcium cyanide compound. When the reaction is finished, the crystals are separated from the mother liquor and are freed from adherent water. In many cases this compound can be used in place of calcium cyanide, an important advantage in view of its stability. It may be freed from ammonia by heating to an elevated temperature, and very pure calcium cyanide is thus obtained. Further quantities of the same double compound can be deposited from the mother liquor by any suitable means, such as concentration in a current of ammonia, unless it be preferred to use the mother liquor for a fresh operation.

*Example 2*

Gaseous hydrocyanic acid containing ammonia is passed into a concentrated solution of calcium nitrate in water, the ammonia-calcium cyanide compound being precipitated in a short time. The hydrocyanic acid may also be admitted in the liquid or gaseous condition before or after the addition of ammonia.

*Example 3*

Crystallized calcium-cyanide diammoniate, prepared by the action of hydrocyanic acid and ammonia on a suspension of lime, according to Example 1 and separated from the mother liquor by centrifuging, is first washed with the washing alcohol from a previous charge and is then mixed with about an equal weight of fresh 96 per cent ethyl alcohol and freed from the alcohol by centrifuging.

By using the spent alcohol over again for the preliminary washing, the amount of fresh alcohol required is reduced to a minimum. Alcohol of lower strength than 96 per cent can also be employed.

Other lower aliphatic alcohols such as methanol or propyl alcohol may be used instead of ethyl alcohol.

After the treatment with alcohol, the salt, which contains 63 per cent of $Ca(CN)_2$ and no free $Ca(OH)_2$, is disposed to a depth of about 15 centimeters in a steam heated drying tube and is heated to about 130° centigrade, under a pressure of about 50 millimeters of mercury, until all the alcohol has been driven off. There remains an ammoniate containing 69.6 per cent of $Ca(CN)_2$ and only 0.5 per cent of $Ca(OH)_2$. When disposed to a depth of about 10 centimeters in an electrically heated furnace and heated to about between 200 and 300° centigrade under reduced pressure, this salt furnishes a calcium cyanide containing 91.3 per cent of $Ca(CN)_2$ and 0.8 per cent of $Ca(OH)_2$.

Thus, the decomposition of the cyanide into calcium hydroxid and hydrocyanic acid has scarcely exceeded 1 per cent during the entire drying and expulsion of ammonia, whereas losses over 10 per cent are incurred in heating the untreated and still moist salt.

*Example 4*

Calcium cyanide diammoniate prepared according to Example 1 and freed from the mother liquor by centrifuging is spread in a thin layer into a closed vessel and is treated at a temperature between about 35–40° centigrade with a stream of ammonia free as far as possible from water until the adherent water is removed. The last traces of water are eliminated by raising the temperature to 100° centigrade or above. Decomposition of the double compound into calcium hydroxid, hydrocyanic acid and ammonia is thus nearly completely avoided. The anhydrous product may be decomposed according to Example 3.

What we claim is:—

1. A process of producing a double compound of calcium cyanide and ammonia which comprises acting upon a compound of calcium selected from the group consisting of calcium oxid, hydroxid and water-soluble salts, with hydrocyanic acid and ammonia in the presence of substantial amounts of water.

2. A process of producing a double compound of calcium cyanide and ammonia which comprises acting upon lime suspended in water with hydrocyanic acid and ammonia.

3. A process of producing a double compound of calcium cyanide and ammonia which comprises acting upon lime suspended in water containing calcium cyanide with hydrocyanic acid and ammonia.

4. As a new article of manufacture the double compound of calcium cyanide and ammonia in the form of macroscopic crystals having a diameter of at least 0.2 millimeter and obtainable by acting on a calcium compound with hydrocyanic acid and ammonia in the presence of substantial amounts of water.

5. A process of producing a double compound of calcium cyanide and ammonia which comprises acting upon a compound of calcium selected from the group consisting of calcium oxid, hydroxid and water-soluble salts, with hydrocyanic acid and ammonia in the presence of substantial amounts of water, separating the double compound formed from the mother liquor and freeing it from the adhering water by placing it in intimate contact with a non-solid hygroscopic substance not decomposing the double compound.

6. A process of producing double compounds of calcium cyanide and ammonia which comprises acting upon a compound of calcium selected from the group consisting of calcium oxid, hydroxid and water-soluble salts, with hydrocyanic acid and ammonia in the presence of substantial amounts of water, separating the double compound formed from the mother liquor and freeing it from adhering water by washing it with an alcohol.

7. As a new article of manufacture substantially pure calcium cyanide in the form of grains having a diameter of at least 0.2 millimeter and being similar in appearance to crystallized calcium cyanide diammoniate and obtaintable therefrom by decomposition.

8. A process of producing calcium cyanide which consists in acting upon a compound of calcium selected from the group consisting of calcium oxid, hydroxid and water-soluble salts, with hydrocyanic acid and ammonia in the presence of substantial amounts of water, separating the double compound formed from the mother liquor and freeing it from the adhering water by placing it in intimate contact with a non-solid hygroscopic substance not decomposing the double compound.

CURT SCHUMANN.
REINHOLD FICK.
ERWIN OBERREIT.